United States Patent
Rivers et al.

(10) Patent No.: US 6,169,571 B1
(45) Date of Patent: Jan. 2, 2001

(54) FILM SCANNING APPARATUS WITH MOTORIZED WEAVE CORRECTION

(75) Inventors: Andrea S. Rivers, Bloomfield; James R. Koudelka, Williamson; Jeffery R. Hawver, Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/057,064

(22) Filed: Apr. 8, 1998

(51) Int. Cl.$^7$ .................................................. H04N 5/253
(52) U.S. Cl. ................................................. 348/96; 348/97
(58) Field of Search ............................... 348/96, 97, 108; H04N 5/253

(56) References Cited

U.S. PATENT DOCUMENTS

| | | |
|---|---|---|
| 4,319,280 | 3/1982 | Roos et al. . |
| 4,823,204 * | 4/1989 | Holland .................................. 348/97 |
| 4,875,103 * | 10/1989 | Bridges et al. ...................... 348/110 |
| 4,933,713 * | 6/1990 | Tsuji et al. ............................. 355/41 |
| 5,088,813 * | 2/1992 | Wakefield .............................. 348/97 |
| 5,107,127 | 4/1992 | Stevens . |
| 5,157,482 * | 10/1992 | Cosgrove ............................... 348/54 |
| 5,266,979 | 11/1993 | Brown et al. . |
| 5,402,166 * | 3/1995 | Mead et al. ............................ 348/96 |
| 5,414,779 * | 5/1995 | Mitch .................................... 382/199 |
| 5,453,653 | 9/1995 | Zumeris . |
| 5,565,912 * | 10/1996 | Easterly et al. ....................... 348/96 |
| 5,596,415 * | 1/1997 | Cosgrove et al. ................... 358/296 |
| 5,600,450 * | 2/1997 | Kaye et al. ............................. 348/99 |
| 5,616,980 | 4/1997 | Zumeris . |
| 5,815,202 * | 9/1998 | Difrancesco ........................... 348/97 |
| 5,959,720 * | 9/1999 | Kwon et al. ............................ 355/38 |
| 6,088,054 * | 7/2000 | Koudelka et al. ..................... 348/96 |

\* cited by examiner

*Primary Examiner*—Chris S. Kelley
*Assistant Examiner*—Tung Vo
(74) *Attorney, Agent, or Firm*—David M. Woods

(57) ABSTRACT

A film scanner is disclosed including a linear image sensor moveable to a scan position for scanning lines of image frames of an elongated film having a series of edge perforations including a reference perforation for each image frame. The film scanner further includes a rotating film gate for supporting the film in the scan position wherein the rotating film gate includes a rotatable encoder for producing an encoder signal indicative of the position of the film as it passes through the rotating film gate, a film transport mechanism for advancing the film through the rotating gate, a perforation detector mounted relative to the scan line of the image frame located at the scan position for producing hop and weave signals in response to detection of the reference perforation, a sensor transport assembly mounted relative to the rotating film gate and moveable in a weave direction, and including means for mounting the image sensor for movement in the weave direction, and signal processing means responsive to the weave signal for causing the sensor transport assembly to move the linear image sensor in the weave direction to align the linear image sensor with the image frame associated with the reference perforation, and further including means responsive to the hop signal and the encoder signal for producing a start scan signal.

30 Claims, 6 Drawing Sheets

FILM SCANNING APPARATUS WITH MOTORIZED WEAVE CORRECTION

CROSS-REFERENCE TO RELATED APPLICATIONS

Reference is made to commonly-assigned U.S. patent application Ser. No. 08/909,788, filed Aug. 12, 1997, entitled "Film Scanning System" by Rivers et al., and U.S. patent application Ser. No. 09/003,385, filed Jan. 6, 1998 entitled "Film Scanning Apparatus" by Koudelka, et al, the disclosures of which are herein incorporated by reference.

FIELD OF THE INVENTION

The present invention relates generally to the field of film scanners, and in particular, to film scanning apparatus for scanning motion picture film.

BACKGROUND OF THE INVENTION

Systems for converting cinematographic (i.e., motion picture) images into digital signals typically include a film transport which moves film from a supply reel to a take up reel. Between the reels, the film passes through a scan gate or shuttle where the image is captured by an image sensor, which is typically a charge coupled device ("CCD") sensor. Such systems are known in the motion picture industry as CCD based telecines or scanners. In these systems, it is important that each scanned frame be positioned in the same location for scanning as its neighboring frames. If this is not possible, the position of each frame during scanning must be known so that any position variation can be corrected in the digital signal, such as by digital image manipulation techniques. In either event, the digital signal corresponds to a "steady" image sequence. Various special effects can then be applied to the digital signals representing such steady image sequences.

To achieve steadiness, film scanners have traditionally used mechanical registration devices in an attempt to duplicate the manner in which a motion picture camera which exposed the film has pin registered each image frame. Such mechanical registration devices range from the most basic film edge guides, through the use of sprocket wheels, to full pin registration systems. Film edge guides attempt to provide control over lateral motion of the film, but edge guides do a poor job of duplicating the registration provided by a pin registered camera. Pin registration systems attempt to duplicate the pin registration system of the exposing camera, in which the pins fully engage through perforation holes in the film. However, sprocket wheels using pins which partially fit a film perforation, reference only one edge of the perforation, while the typical tolerance on the dimension between the center of a film perforation and the film edge varies by +/−50 micrometers. Additionally, the standard specification for the variation of the width of a film perforation is +/−10 micrometers. Thus, such partially fitting pins leave room for mis-positioning of a perforation, and hence, an associated film frame during scanning. While these numbers may seem small, it must be remembered that following image processing, such as for special effects, the scanned motion picture images will be re-printed on a motion picture film. This re-printed film (or copies of it) will be substantially magnified for projection onto the screen of a theater. Mis-positioning between successive frames during scanning thereby results in a highly visible and undesirable movement of an image or portion of a composite image on a screen.

Attempts have been described in U.S. Pat. No. 5,266,979 to combine edge guidance and full fitting pins with a sprocket wheel arrangement. However, this system over constrains the film as it passes through a film gate for scanning, which can result in film flatness or image distortion problems. Further, in any sprocket wheel arrangement, since the same pins do not contact each frame, a large emphasis is placed upon the quality of manufacturing processes for sprocket wheels.

Pure pin registration systems utilize both a full fitting big pin to engage perforations along one side of the film, and a partial fitting little pin to engage perforations along the other edge of the film, to exactly constrain the film in the x and y directions, and to prevent rotation of the film. The same pins are used to register each frame. When properly designed and maintained, these systems provide the best duplication of camera pin registration. However, there are disadvantages to the use of mechanical pin registration. In general, such systems are intermittent motion systems with lower throughput. Further, the design, construction, and maintenance of the registration mechanism and the pins are expensive. In addition, the complexity and cost of the subsystems surrounding a pin registered film scanning gate is relatively high. Furthermore, the risk of perforation damage is a constant concern. This is particularly true since film age and means of storage will effect the dimensions and elasticity of the film. Thus, the risk of damage to archived films increases in a pin registered system. As a result, pin registered systems are not used in high throughput motion picture film scanning systems.

Non-contact perforation detection systems avoid the risk of film damage, and can run at high speed. In addition, non-contact perforation detection systems are inexpensive and can be easily maintained. Several non-contact perforation detection systems have been described, for example, in commonly-assigned U.S. Pat. No. 5,107,127, the disclosure of which is herein incorporated by reference. U.S. Pat. No. 4,319,280 discloses a film scanner with an encoder wheel which is remote from the actual scanning position of the film. However, these non-contact perforation detection systems do not appreciate any problems associated with dimensional variations along the length of a film being scanned.

SUMMARY OF THE INVENTION

Accordingly, it is an object of the present invention to provide a film scanner for a motion picture film which accurately aligns an image sensor over a film frame to be scanned to substantially minimize errors resulting from film dimensional variations along the length of the film.

This object is achieved by a film scanner including a linear image sensor moveable to a scan position for scanning lines of image frames of an elongated film having a series of edge perforations including a reference perforation for each image frame, comprising:

(a) a rotating film gate for supporting the film in the scan position, the rotating film gate including a rotatable encoder for producing an encoder signal indicative of the position of the film as it passes through the rotating film gate;

(b) a film transport mechanism for advancing the film through the rotating gate;

(c) a perforation detector for producing hop and weave signals in response to detection of the reference perforation, the perforation detector being mounted relative to the scan line of the image frame located at the scan position;

(d) a sensor transport assembly mounted relative to the rotating film gate and moveable in a weave direction, and including means for mounting the image sensor for movement in the weave direction; and (e) signal processing means responsive to the weave signal for causing the sensor transport assembly to move the linear image sensor in the weave direction to align the linear image sensor with the image frame associated with the reference perforation, and further including means responsive to the hop signal and the encoder signal for producing a start scan signal.

ADVANTAGES

An advantage of the present invention is to provide a film scanner which accurately determines the position of the film frame for scanning with minimal error resulting from film dimensional variations along the length of the film. As a result, a motion picture film which has been scanned using such a film scanner, re-printed, and projected onto a screen does not exhibit significant motion due to scanning errors when projected.

DETAILED DESCRIPTION OF THE INVENTION

Figure 1:
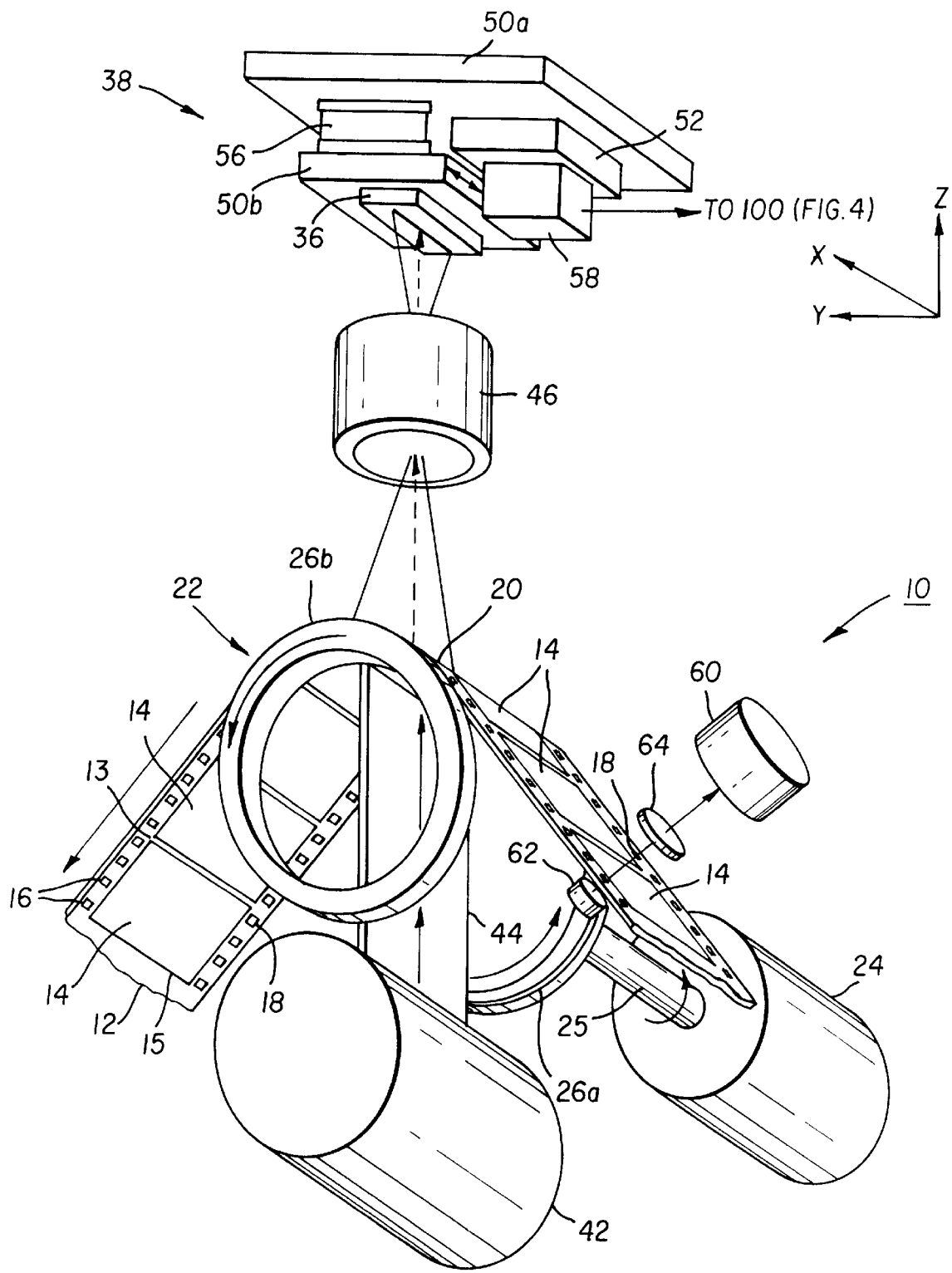
FIG. 1 is a perspective view of a film scanner in accordance with the present invention.
Figure 2:
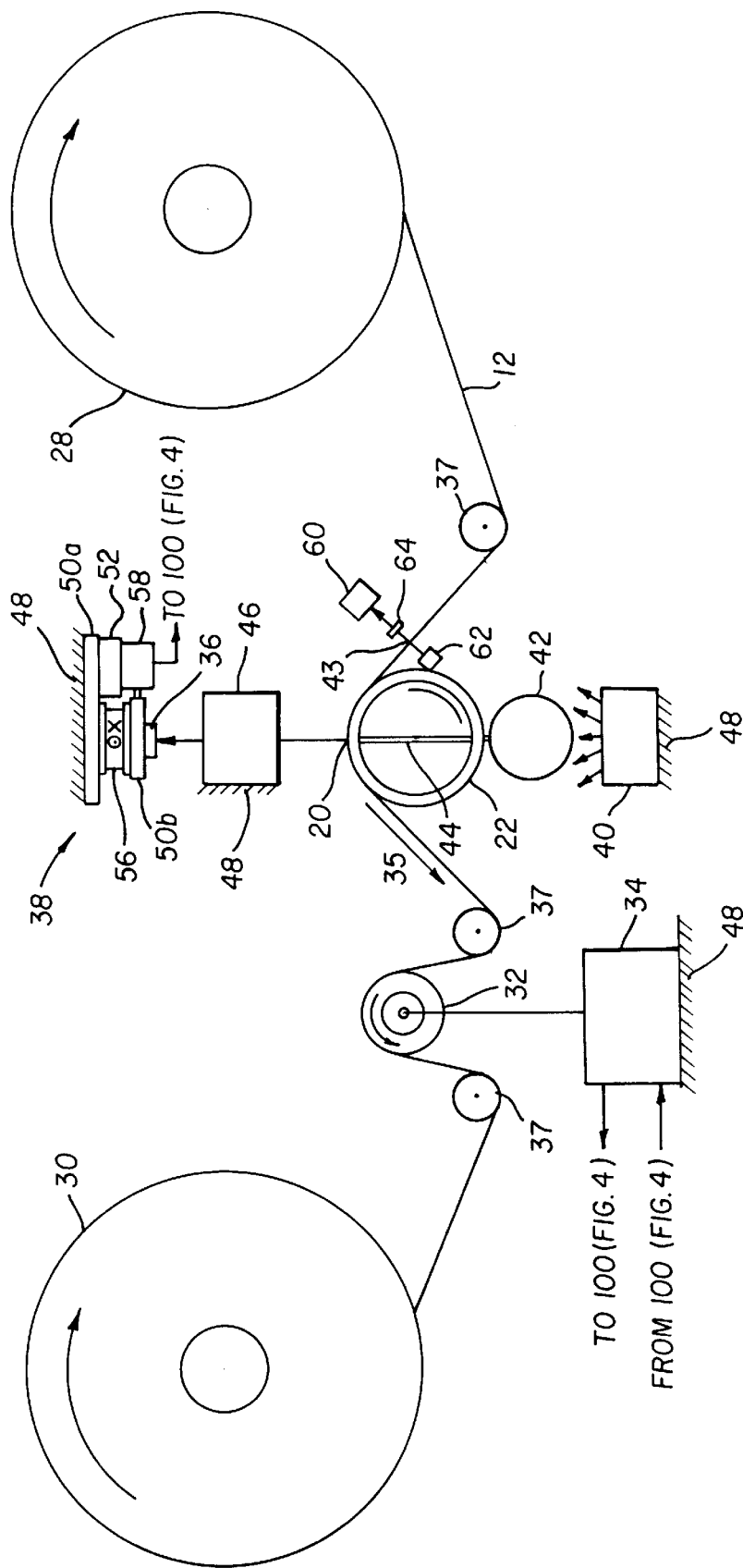
FIG. 2 is a schematic side view of the film scanner of FIG. 1.

Referring to FIGS. 1 and 2, a film scanner 10 for scanning image frames of an elongated film, such as a motion picture film, in accordance with the present invention is shown. FIG. 1 is a perspective view of the film scanner 10 and FIG. 2 is a side view of the film scanner 10. It will be understood that a motion picture film is typically considered to be a continuous film web (or a portion thereof) of at least 10 meters (or even greater than 100 meters), with portions of that length typically not having been spliced, and with the film having been obtained from a single camera. As shown in FIG. 1, the elongated film 12 includes image frames 14 to be scanned. The image frames 14 are separated by interframe gaps 13. Each image frame 14 includes a series of edge perforations 16 along at least one edge of the film 12. The edge perforations 16 are used in a motion picture camera (not shown) to move the film 12 and to align the film 12 to a set of registration pins in the camera for each exposure. Thus, the edge perforations 16 are a reference to which the image is placed on the film 12 by the camera. Often in motion picture film, every fourth edge perforation 16 is a reference perforation 18. Each reference perforation 18 is associated with a corresponding image top of frame 15 since during exposure of the film 12, that is the perforation which is normally engaged by the camera perforation pin when the corresponding frame is being exposed. Thus, by locating the reference perforation 18, it is possible to locate the image frame 14 to be scanned.

As shown in FIG. 1, the film scanner 10 includes a rotating film gate 22 for supporting the film 12 in a scan position 20 during scanning. The rotating film gate 22 includes two spaced-apart, axially aligned rotatable wheels 26a and 26b, and a rotatable encoder 24 which is fixed to rotatable wheel 26a by an encoder shaft 25. Preferably, the two axially aligned rotatable wheels 26a and 26b are axially coupled. The rotating film gate 22 uses edge guidance (not shown) on the rotatable wheels 26a and 26b to support the film 12 and to control the position of the image frame 14 in the x-direction (weave direction) transverse to the motion of the film 12. Film edge guidance is provided by constraining the film 12 in a known manner so that the film 12 is held against the rotatable wheel 26a when the image frame 14 to be scanned has moved to the scan position 20. See commonly-assigned U.S. patent application Ser. No. 08/909,788 for a more detailed description of the rotating film gate 22.

As shown in FIG. 2, a film transport mechanism advances the film 12 through the rotating film gate 22. The film transport mechanism includes a supply reel 28 and a take-up reel 30, which are driven by a capstan drive 32 including a motor 34 in a manner well known in the art. The motor 34 is under the control of a signal processor 100 (shown in FIG. 4), and is driven by a signal 33 (shown in FIG. 4). The signal processor 100 can be, for example, a microcomputer. Typically, the capstan drive 32 includes an encoder (not shown) for providing a pulse train 39 (shown in FIG. 4) to the signal processor 100 for controlling the position of the capstan drive 32 in a manner well known in the art. The supply reel 28, take-up reel 30, and capstan drive 32 keep the film 12 under tension as the film 12 is advanced in a film travel direction 35, causing the rotatable wheels 26a and 26b of the rotating film gate 22 to turn. The encoder shaft 25 (shown in FIG. 1) meters the rotation of the rotatable wheels 26a and 26b. The rotatable encoder 24 (shown in FIG. 1) produces an encoder signal in the form of pulses 110 (shown in FIG. 4) indicative of the angular position of the rotatable wheels 26a and 26b, and thus, the position of the film 12, as the film 12 passes through the rotating film gate 22. Guide idler rollers 37, as shown in FIG. 2, control the angle of wrap around the capstan drive 32, and in effect, facilitate advancement of the film 12 through the rotating film gate 22.

A linear image sensor 36 is mounted on a sensor transport assembly 38 for scanning the image frame 14 (shown in FIG. 1). An illumination source 40 mounted on a stationary scanner housing 48 relative to the rotating film gate 22 includes an integrating cylinder 42 and a light pipe or light rod 44 directed through the rotating film gate 22 to the film 12. Light from the illumination source 40 is directed into the integrating cylinder 42 by, for example, a fiber optic bundle or a lens system (not shown). In a known manner, the integrating cylinder 42 forms a source of uniform illumination containing substantially no hot spots, and transmits the light through a slit (not shown) in the top of the integrating cylinder 42. The light pipe 44 receives the light from the integrating cylinder 42, and creates a line of bright illumination which extends across the image frame 14 located at the scan position 20 as the film 12 moves through the rotating film gate 22. This line of illumination is hereinafter referred to as a scan line. A lens assembly 46 which is mounted to the stationary scanner housing 48 projects an image of the scan line of the image frame 14 onto the linear image sensor 36. The linear image sensor 36 and the illumination source 40 are well known in the art of film scanning. It should be noted that, alternatively, the integrating cylinder 42 could be positioned inside of the rotating film gate 22 so that the slit (not shown) would be located directly under the film 12, thereby eliminating the need for the light pipe 44.

The sensor transport assembly 38 as depicted in FIGS. 1 and 2 includes a linear translation stage 50 having a fixed base 50a which is securely mounted to the stationary scanner housing 48. The linear translation stage 50 further includes a moveable stage 50b which is constrained to move in only one direction. In accordance with the present invention, the orientation of the mounting of the linear translation stage 50 is such that the moveable stage 50b is movable in the x-direction (weave direction) transverse to the motion of the film 12.

The linear image sensor 36 is securely mounted to the moveable stage 50b of the sensor transport assembly 38. The moveable stage 50b is mounted to a plurality of spaced-apart flexures 56 which are mounted to the fixed base 50a. Preferably, there are two flexures 56 which are parallel and of equal length. For simplicity, only one flexure 56 is shown in FIGS. 1 and 2. The two flexures 56, and thus, the linear image sensor 36, are moveable in the weave direction relative to the fixed base 50a. Movement of the flexures 56 and the linear image sensor 36 is controlled by a micromotor 58. The micromotor 58 is securely fixed to a mounting block 52 which is fixedly attached to the moveable stage 50b of the sensor transport assembly 38. The micromotor 58 provides the driving force to move the moveable stage 50b relative to the fixed base 50a in the weave direction. Preferably, the micromotor 58 is a piezo-electric ceramic motor which moves in nanometer increments. Such a micromotor is described in more detail in U.S. Pat. No. 5,453,653 and U.S. Pat. No. 5,616,980, the disclosures of which are herein incorporated by reference. It should be noted that movement of the linear image sensor 36 in the weave direction can be implemented using other transport mechanisms, such as a piezo-electric stack or inchworm drive, a voice coil motor, or any other prime mover. However, the use of a micromotor as disclosed in U.S. Pat. Nos. 5,453,653 and 5,616,980 is preferred because of cost, as well as the capability of both high speed and small incremental precision motion.

The film scanner 10 further includes a perforation detector 60, a light source 62, and conventional optics 64 for detecting an image of the reference perforation 18 associated with the image frame 14 to be scanned. The light source 62 is mounted to the stationary scanner housing 48 so that the light is transmitted through the reference perforation 18 such that the reference perforation 18 is detected prior to the arrival of the associated image frame 14 at the scan position 20. Preferably, the distance along the path of the film 12 between a detection point 43, which is the point on the film 12 where the centerline of the perforation detector 60 intersects the plane of the film 12, and the scan position 20 is minimized. The light source 62 can be, for example, a tungsten lamp coupled with a 450 nanometer bandpass filter. The perforation detector 60 is fixed to the stationary scanner housing 48 with a known distance relative to the scan line of the image frame 14 located in the scan position 20. The optics 64 focuses the image of the reference perforation 18 onto the perforation detector 60.

Figure 3A:
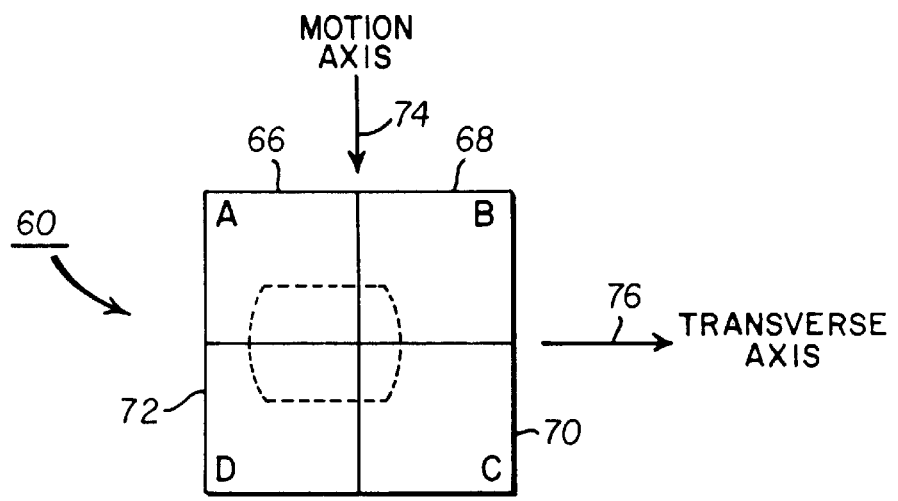
FIG. 3 is a graph of the Hop and Weave signals produced by the perforation detector of FIG. 1.
Figure 3B:
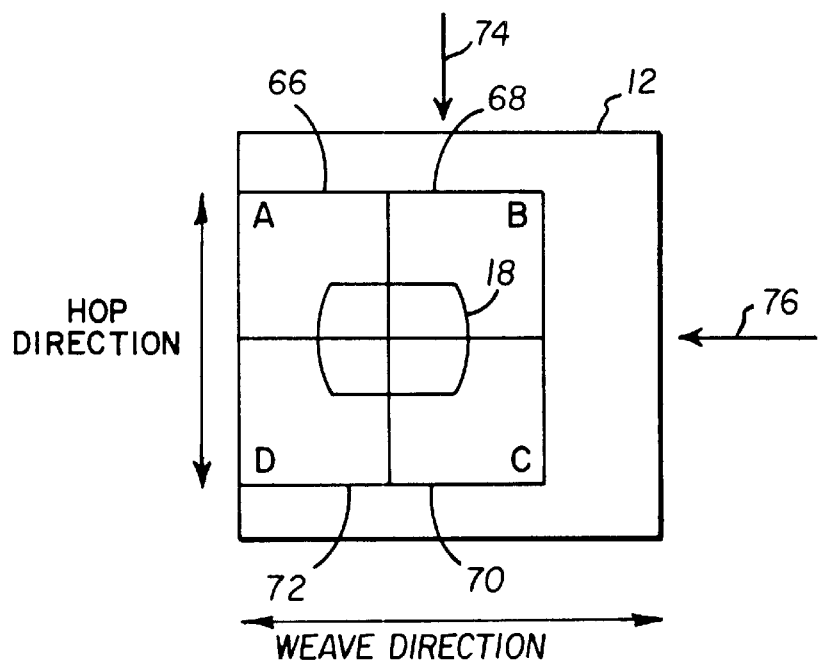

Turning to FIGS. 3A and 3B, the perforation detector 60 in accordance with the present invention is shown in more detail. As shown in FIG. 3A, the perforation detector 60 is preferably a quadrant detector of the type shown in U.S. Pat. No. 5,107,127. The quadrant perforation detector 60 is a conventional light sensitive device containing four regions of light sensitivity or light sensing elements 66, 68, 70, and 72. The quadrant perforation detector 60 is arranged orthogonally with elements 66, 68, 70, and 72 on both sides of a motion axis 74 and a transverse axis 76. The motion axis 74 is parallel to the film travel direction 35 and the hop direction. The transverse axis 76 is perpendicular to the motion axis 74 and parallel to the weave direction. The elements 66, 68, 70, and 72 should be positioned as closely as possible to their neighbors across the dividing axis so that the gap at the axis is as small as possible. The elements 66, 68, 70, and 72 can be round or some other shape, however, rectangular or square shaped elements are preferable. Each region or light sensitive element 66, 68, 70, and 72 of the quadrant perforation detector 60 preferably is designed with uniform sensitivity.

Elements 66, 68, 70, and 72 of the perforation detector 60 each produce an analog signal in response to the detected image of the reference perforation 18. These four analog signals are used to produce a Hop signal 78 and a Weave signal 80 which indicate the location of the perforation detector 44 relative to the reference perforation 18. The Hop signal 78 provides perforation location information along the length of the film 12, and is defined as the normalized difference between the sum of the signals produced by elements 70 and 72, and the sum of the signals produced by elements 66 and 68. The Weave signal 80 is proportional to the amount of light falling on one of the sides of the motion axis 74, and therefore, provides location information across the film 12 or transverse to the length of the film 12. The Weave signal 80 is defined as the normalized difference between the sum of the signals produced by elements 66 and 72, and the sum of the signals produced by elements 68 and 70. The Hop signal 78 and the Weave signal 80 are set forth in equations (1) and (2), respectively, as follows:

$$H = \frac{(A-C)+(B-D)}{A+B+C+D} \tag{1}$$

$$W = \frac{(A-C)-(B-D)}{A+B+C+D} \tag{2}$$

wherein H is the Hop signal 78, W is the Weave signal 80, and A, B, C, and D are the outputs of the corresponding elements 66, 68, 70, and 72, respectively, as illustrated in FIGS. 3A and 3B.

Figure 4:
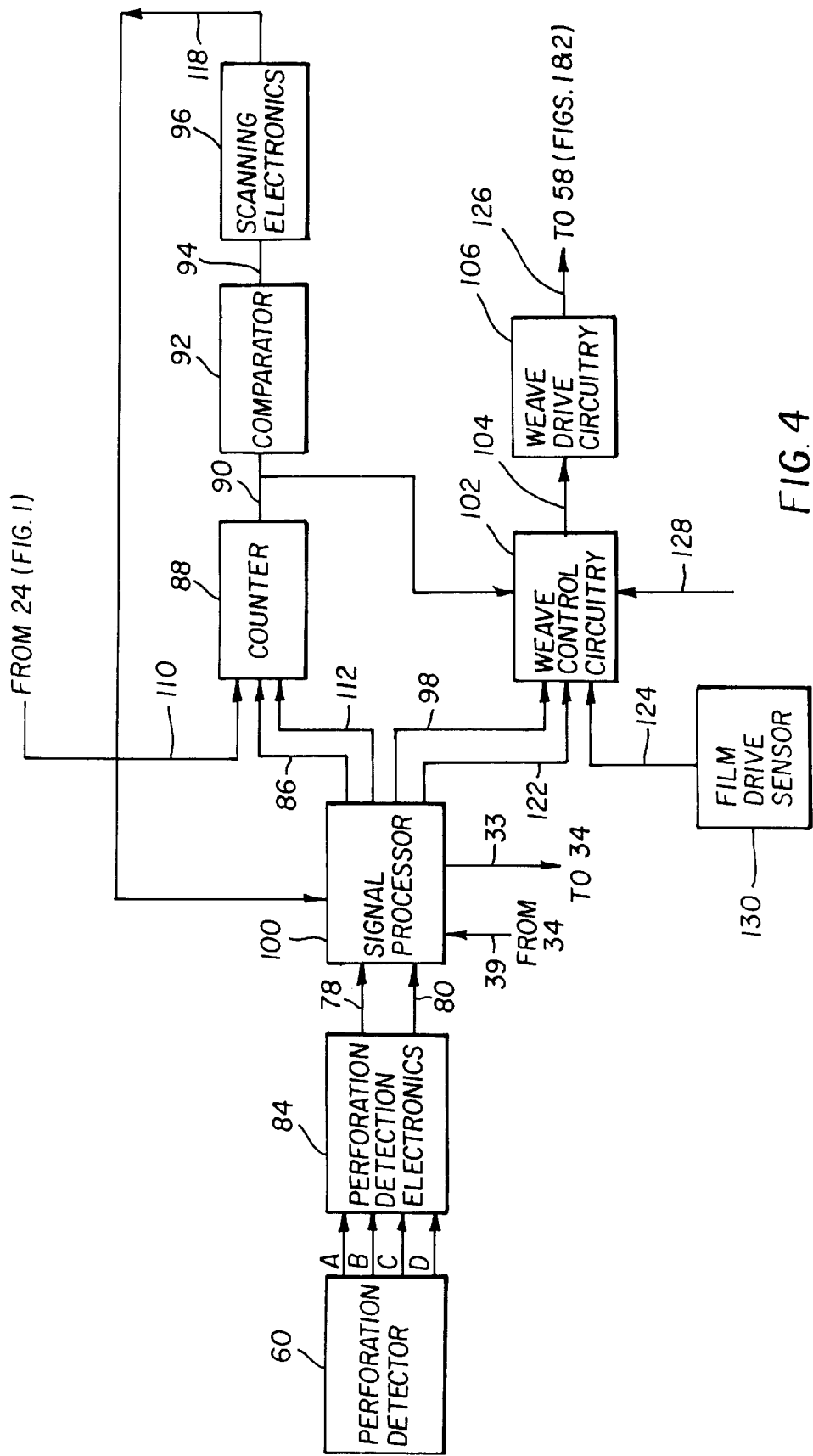
FIG. 4 is a block diagram of the circuitry for driving the sensor transport assembly of the film scanner of FIG. 1 in the weave direction.
Figure 5:
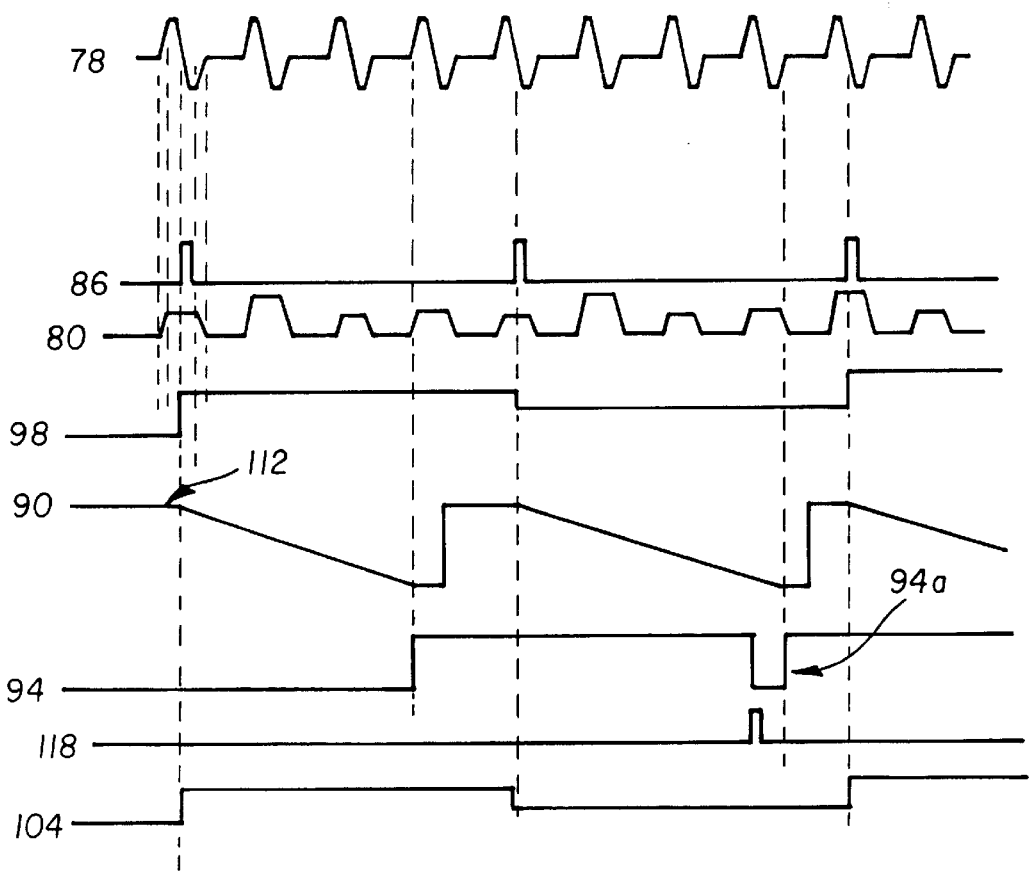
FIG. 5 is a timing diagram for the operation of the film scanner of FIG. 1.

Referring to FIGS. 4 and 5, the operation of the film scanner 10 will be described. FIG. 4 is a block diagram of the circuitry which drives the micromotor 58 in the weave direction and produces a scan signal 94 to indicate that the image frame 14 located in the scan position 20 can be scanned. FIG. 5 is a timing diagram for the operation of the film scanner 10. In operation, the film transport mechanism advances the film 12 past the perforation detector 60 and then over the rotating film gate 22 between the linear image sensor 36 and the light source 62. Contact of the film 12 with the rotating film gate 22 causes the rotating film gate 22 and the rotatable encoder 24 to both rotate at the same rate as the film 12. As previously discussed, the perforation detector 60 is fixed to the stationary scanner housing 48 with a predetermined distance from the scan line of the image frame 14 located in the scan position 20. This is shown in FIGS. 1 and 2. Since the distance between the perforation detector 60 and the scan line of the image frame 14 located in the scan position 20 is a known constant, this distance can be accurately determined by accumulating the number of encoder pulses 110 produced by the rotatable encoder 24. Thus, scanning of the image frame 14 located at the scan position 20 can begin after a known number of encoder pulses have been produced by the rotatable encoder 24.

In accordance with the present invention, as the center of each perforation 16 passes the center of the perforation detector 60, the perforation detector 60 produces signals A, B, C, and D, as shown in FIG. 4. These signals are provided as input to perforation detection electronics 84 to produce the Hop signal 78 and the Weave signal 80. Typical waveforms for the Hop signal 78 and the Weave signal 80 are shown in FIG. 5. The Hop signal 78 and the Weave signal 80 are sent to the signal processor 100, which produces a trigger signal 86 and a sampled weave signal 98. The rising edge of the trigger signal 86 indicates that the reference perforation 18 is centered over the perforation detector 60 and is generated in response to the Hop signal 78 having a negative slope and a value substantially equal to zero. The sampled weave signal 98 is generated by sampling and holding the value of the Weave signal 80 at the point in time identified by the rising edge of the trigger signal 86. The trigger signal 86 is directed to a counter 88 that is preset to a predetermined value 112 (shown in FIG. 5) which represents the distance (in encoder pulses 110 from the rotatable encoder 24) from the center of the perforation detector 60 to the scan line of the image frame 14 located at the scan position 20. As shown in FIG. 5, when the counter 88 receives the rising edge of the trigger signal 86, the counter 88 begins counting down one count per encoder pulse 110. The output of the counter 88 is shown in FIG. 5 as an analog signal 90 for simplicity. A comparator 92 monitors the value of the counter 88, and when the counter 88 reaches zero, a scan signal 94 is sent to scanning electronics 96 to initiate the scanning of the image frame 14. An end of scan pulse 118 is generated by the scanning electronics 96 when scanning is complete. It should be noted that when scanning is complete, the linear image sensor 36 is either returned to its initial start scan position or is incrementally adjusted for scanning of the next image frame 14.

The end of scan pulse 118 is input to the signal processor 100. Assuming, in this case, the film format is such that interframe gaps 13 exist between image frames 14 (as shown in FIG. 1), a time period exists between the end of scan pulse 118 and the next rising edge 94a of the scan signal 94, as shown in FIG. 5. During this period of time, rapid weave correction is enabled by a correction signal 122, which is produced by the signal processor 100. The sampled weave signal 98 is then converted to a displacement value, called weave error, within the signal processor 100. A determination is made in weave control circuitry 102 as to whether the system will be capable of correcting the weave error within the interframe gap 13. This determination is based upon the amount of weave error, the value of the output of the counter 88 (shown as the analog signal 90) at the point identified by the end of scan pulse 118, and the performance capability of the sensor transport assembly 38. Typically, the sensor transport assembly 38 will be able to accomplish the weave correction within this time. When the weave error can be corrected within the interframe gap 13, the weave control circuitry 102 generates a drive command signal 104 which is sent to weave drive circuitry 106. The weave drive circuitry 106 generates a drive signal 126 which is sent to the micromotor 58 to effect the weave correction.

It will understood by those skilled in the art that should the situation arise where the desired weave correction exceeds that which can be accomplished within the interframe gap 13, a two phase correction scheme can be employed or an error can be issued to an operator. In such a two phase correction scheme, a maximum amount of correction would be applied during the interframe gap 13, and the remainder would be slowly applied throughout the scanning of the image frame 14. Should the film format be such that an interframe gap 13 does not exist, the weave correction would be applied during scanning. In all cases regardless when the weave correction is employed, a weave correction limit 128 set by the operator is used to identify unusually large weave corrections. This weave correction limit 128 is used by the weave control circuitry 102 to identify image frames 14 which should be rescanned or weave corrected offline.

It should be noted that the previous description of FIG. 4 describes the tracking of the position of only one image frame 14 from the detection point 43 to the scan position 20. It will be obvious to those skilled in the art that a duplicity of counters 88 would be required to track each image frame 14 that existed between the detection point 43 and the scan position 20 when the distance between the detection point 43 and the scan position 20 is greater than one image frame 14. It will be further understood that the circuitry set forth in FIG. 4 is representative, and that various circuits could be used in accordance with the present invention which would suggest themselves to those skilled in the art.

In order for the weave correction of the linear image sensor 36 to be accurate, the weave error measured by the perforation detector 60 (when the reference perforation 18 associated with the image frame 14 to be scanned was under the perforation detector 60) should be made relative to the edge of the film 12 adjacent to the reference perforation 18. As previously described, the film 12 is edge-guided at the rotating film gate 22, and the weave error measurement is made by the perforation detector 60 which is located a distance from the rotating film gate 22. Since the distance between the center of the reference perforation 18 and the edge of the film 12 can vary by as much as +/−50 micrometers along the length of the film 12, the weave error measured at the perforation detector 60 can be different from the weave error at the rotating film gate 22, causing a measurement error in the weave calculation. Thus, in accordance with the present invention, the perforation detector is positioned close enough to the scan position to substantially minimize measurement error in the weave calculation caused by such dimensional variations.

Further, since the film 12 is edge guided by the rotating film gate 22, the film 12 cannot be constrained by the guide idler rollers 37 positioned on either side of the rotating film gate 22 so that the film 12 can move freely in the weave direction and align its edge to the rotating film gate 22. This can cause the edge of the film 12 to weave slightly at the location of the perforation detector 60. Such weave is hereinafter referred to as film edge weave. Since the perforation detector 60 is fixedly secured to the stationary scanner housing 48, any slight film edge weave can cause additional measurement errors in the weave error measurement made by the perforation detector 60. In the event that film edge weave has an effect on weave correction, a film edge sensor 130 (shown in FIG. 6) could be used to substantially eliminate this effect by tracking and measuring where the edge of the film 12 is located at the same time that the location of the reference perforation 18 is measured by the perforation detector 60.

Figure 6:
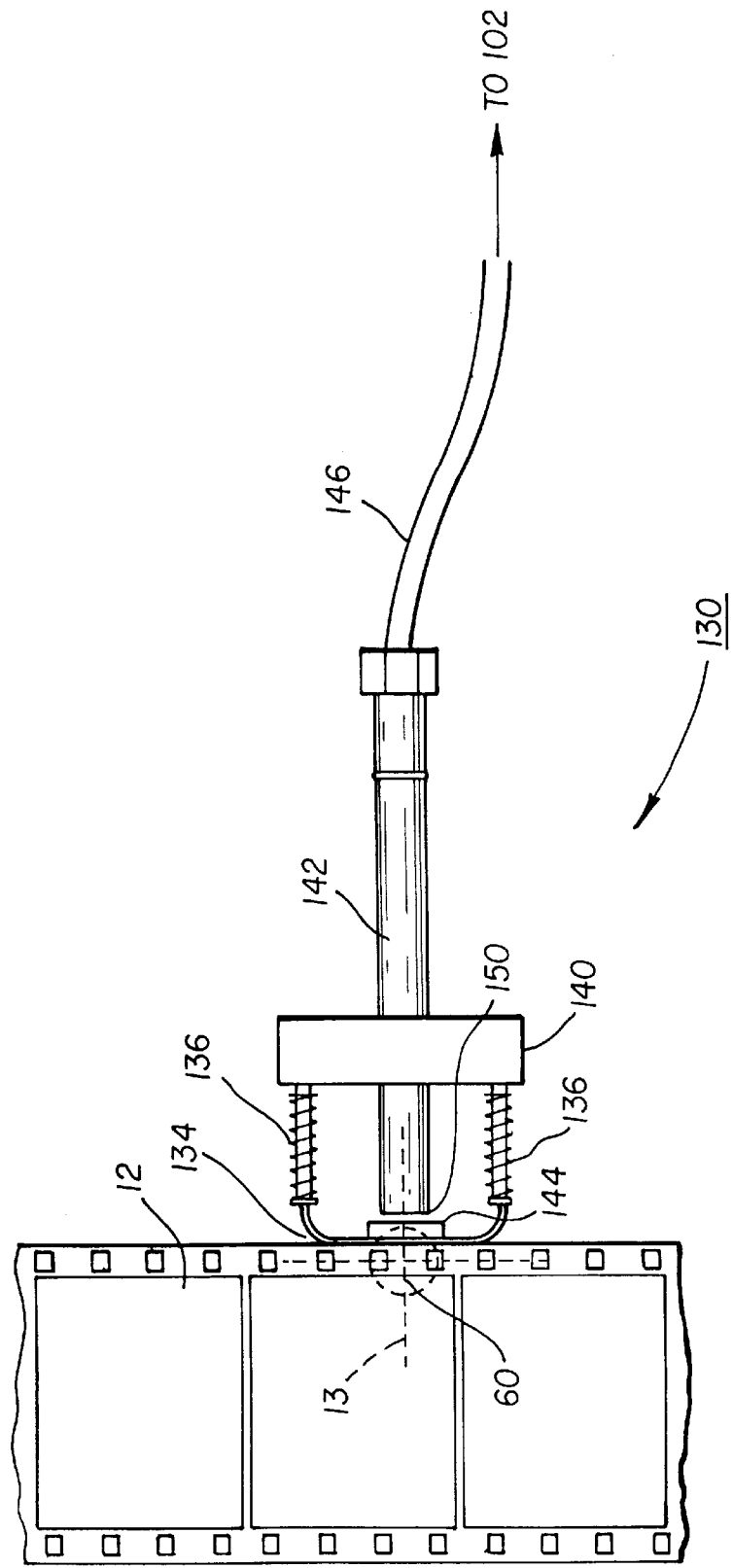
FIG. 6 is a schematic side view of the film scanner of FIG. 1 including a film edge sensor for determining film edge weave prior to scanning.

Referring now to FIG. 6, the film edge sensor 130 will be described in more detail. The film edge sensor 130 provides an offset signal 124 to the weave control circuitry 102 to be used in the weave error calculation (previously described in conjunction with FIGS. 4 and 5) to determine how much the linear image sensor 36 must be moved to compensate for the weave error. Preferably, the film edge sensor 130 is positioned directly adjacent to the perforation detector 60 such that the center line of the film edge sensor 130 coincides with the center line of the perforation detector 60. These center lines are shown as line 132 on FIG. 6. Thus, when the reference perforation 18 is detected to be directly under the perforation detector 60, the reference perforation 18 will also be directly at the center of the film edge sensor 130.

As shown in FIG. 6, the film edge sensor 130 includes an edge following guide 134, which is movable by springs 136 such that the edge following guide 134 is held against the edge of the film 12. The edge following guide 134 will thus follow the edge of the film 12 for any displacements in the weave direction that may occur as the film 12 moves through the sensor transport assembly 38. The edge following guide 134 and the springs 136 must provide enough force to keep the edge following guide 134 in contact with the edge of the film 12 at all times, yet cannot have so much force as to interfere with the edge guidance forces provided by the rotating film gate 22 and other structures of the sensor transport assembly 38.

The edge following guide 134 and the springs 136 are held by a stationary mounting bracket 140 which is fixedly secured to the stationary scanner housing 48. A capacitance probe 142 is also fixedly secured to the mounting bracket 140 so that all film edge weave motions are measured relative to the mounting bracket 140. A metal plate 144 is mounted directly to the movable edge following guide 134, and moves with the edge following guide 134. The function of the metal plate 144 is to provide a sensing surface for the capacitance probe 142. The capacitance probe 142 generates the offset signal 124, which is proportional to the distance or spacing between an edge 150 of the capacitance probe 142 and the metal plate 144. Movement of the edge following guide 134 and the metal plate 144 due to the film edge weave causes the spacing between the edge 150 of the capacitance probe 142 and the metal plate 144 to change. This change in spacing results in a change in the offset signal 124 which is directly proportional to the weave of the edge of the film 12. The offset signal 124 from the capacitance probe 142 is sent to the weave control circuitry 102 (see FIG. 4) through a sensor cable 146. In the weave control circuitry 102, the offset signal 124 is converted to a displacement value using a known calibration constant of the capacitance probe 142, and is subtracted from the sampled weave signal 98 before the sampled weave signal 98 is converted into the weave error within the signal processor 100 (as described in conjunction with FIG. 4).

Although the present invention has been described with reference to movement of the linear image sensor 36 to align the linear image sensor 36 with the image frame 14 to be scanned, it will be understood by those skilled in the art that alignment of the linear image sensor 36 with the image frame 14 could be accomplished by movement of the image frame 14 in the weave direction rather than by movement of the linear image sensor 36. Appropriate structures for such movement of the image frame 14 would suggest themselves to those skilled in the art.

The use of the above described film scanner including the rotating film gate 22 with the rotatable encoder 24 and the sensor transport assembly 38 substantially reduces errors in the determined position of an image frame 14 resulting from film dimensional variations along its length. The pin-free image registration system is lower in cost than a pure pin registered system, or a full fitting sprocket system. In addition, the pin-free image registration system is easier to load with film than either of the pin registered options.

The invention has been described in detail with particular reference to certain preferred embodiments thereof, but it will be understood that variations and modifications can be effected within the spirit and scope of the invention.

| PARTS LIST | |
|---|---|
| 10 | film scanner |
| 12 | film |
| 13 | interframe gap |
| 14 | image frame |
| 15 | image top of frame |
| 16 | edge perforation |
| 18 | reference perforation |
| 20 | scan position |
| 22 | rotating film gate |
| 24 | rotatable encoder |
| 25 | encoder shaft |
| 26a, 26b | rotatable wheel |
| 28 | supply reel |
| 30 | take-up reel |
| 32 | capstan drive |
| 33 | signal |
| 34 | motor |
| 35 | film travel direction |
| 36 | linear image sensor |
| 37 | guide idler roller |
| 38 | sensor transport assembly |
| 39 | pulse train |
| 40 | illumination source |
| 42 | integrating cylinder |
| 43 | detection point |
| 44 | light pipe |
| 46 | lens assembly |
| 48 | scanner housing |
| 50 | linear translation stage |
| 50a | fixed base |
| 50b | moveable stage |
| 52 | mounting block |
| 56 | flexures |
| 58 | micromotor |
| 60 | perforation detector |
| 62 | light source |
| 64 | optics |
| 66 | light sensing element |
| 68 | light sensing element |
| 70 | light sensing element |
| 72 | light sensing element |
| 74 | motion axis |
| 76 | transverse axis |
| 78 | Hop signal |
| 80 | Weave signal |
| 84 | perforation detection electronics |
| 86 | trigger signal |
| 88 | counter |
| 90 | analog signal |
| 92 | comparator |
| 94 | scan signal |
| 94a | rising edge of the scan signal |
| 96 | scanning electronics |
| 98 | sampled weave signal |
| 100 | signal processor |
| 102 | weave control circuitry |
| 104 | drive command signal |
| 106 | weave drive circuitry |
| 110 | encoder pulse |
| 112 | predetermined counter value |
| 118 | end of scan pulse |
| 122 | correction signal |
| 124 | offset signal |
| 126 | drive signal |
| 128 | weave correction limit |
| 130 | film edge sensor |
| 132 | center line |
| 134 | edge following guide |
| 136 | spring |
| 140 | mounting bracket |
| 142 | capacitance probe |
| 144 | metal plate |

-continued

PARTS LIST

| 146 | sensor cable |
| 150 | edge of capacitance probe |

What is claimed is:

1. A film scanner including a linear image sensor moveable to a scan position for scanning lines of image frames of an elongated film having interframe gaps between image frames and a series of edge perforations including a reference perforation for each image frame, comprising:

(a) a rotating film gate for supporting the film in the scan position, the rotating film gate including a rotatable encoder for producing an encoder signal indicative of the position of the film as it passes through the rotating film gate;

(b) a film transport mechanism for advancing the film through the rotating gate;

(c) a perforation detector for producing hop and weave signals in response to detection of the reference perforation, the perforation detector being mounted relative to the scan line of the image frame located at the scan position;

(d) a sensor transport assembly mounted relative to the rotating film gate and moveable in a weave direction, and including means for mounting the image sensor for movement in the weave direction; and (e) signal processing means responsive to the weave signal for causing the sensor transport assembly to move the linear image sensor in the weave direction within an interframe gap to align the linear image sensor with the image frame associated with the reference perforation, and further including means responsive to the hop signal and the encoder signal for producing a start scan signal.

2. The film scanner according to claim 1 wherein the signal processing means causes the linear image sensor to be moved gradually in the weave direction during the scanning of the image frame.

3. The film scanner according to claim 1 further including a source of radiation for illuminating scan lines of the image frame when the image frame is in the scan position.

4. The film scanner according to claim 3 wherein the source of radiation provides a line of illumination which extends across the film.

5. The film scanner according to claim 1 further including a source of radiation for illuminating the reference perforation, and means responsive to the radiation transmitted through the reference perforation to produce the hop and weave signals.

6. The film scanner according to claim 1 wherein the rotating film gate further includes two spaced-apart axially aligned rotatable wheels coupled to the rotatable encoder.

7. The film scanner according to claim 1 wherein the image sensor mounting means includes a plurality of flexures.

8. The film scanner according to claim 7 wherein there are two spaced-apart flexures which are parallel and of equal length.

9. A film scanner including a linear image sensor moveable to a scan position for scanning lines of image frames of an elongated film having interframe gaps between image frames and a series of edge perforations including a reference perforation for each image frame, comprising:

(a) a rotating film gate for supporting the film in the scan position, the rotating film gate including a rotatable encoder for producing an encoder signal indicative of the position of the film as it passes through the rotating film gate;

(b) a film transport mechanism for advancing the film through the rotating gate;

(c) a perforation detector for producing hop and weave signals in response to detection of the reference perforation, the perforation detector being mounted relative to the scan line of the image frame located at the scan position;

(d) a sensor transport assembly mounted relative to the rotating film gate and moveable in a weave direction, and including means for mounting the image sensor for movement in the weave direction;

(e) a film edge sensor mounted relative to the perforation detector for detecting displacement of the edge of the film in the weave direction, and for producing an offset signal in response to such displacement; and (f) signal processing means responsive to the weave signal and the offset signal for causing the sensor transport assembly to move the linear image sensor in the weave direction within an interframe gap to align the linear image sensor with the image frame associated with the reference perforation, and further including means responsive to the hop signal and the encoder signal for producing a start scan signal.

10. The film scanner according to claim 9 wherein the signal processing means causes the linear image sensor to be moved gradually in the weave direction during the scanning of the image frame.

11. The film scanner according to claim 9 further including a source of radiation for illuminating scan lines of the image frame when the image frame is in the scan position.

12. The film scanner according to claim 11 wherein the source of radiation provides a line of illumination which extends across the film.

13. The film scanner according to claim 9 wherein the rotating film gate further includes two spaced-apart axially aligned rotatable wheels coupled to the rotatable encoder.

14. The film scanner according to claim 9 wherein the image sensor mounting means includes a plurality of flexures.

15. The film scanner according to claim 14 wherein there are two spaced-apart flexures which are parallel and of equal length.

16. A film scanner including a linear image sensor moveable to a scan position for scanning lines of image frames of an elongated film having a series of edge perforations including a reference perforation for each image frame, comprising:

(a) a rotating film gate for supporting the film in the scan position, the rotating film gate including a rotatable encoder for producing an encoder signal indicative of the position of the film as it passes through the rotating film gate;

(b) a film transport mechanism for advancing the film through the rotating gate;

(c) a perforation detector for producing hop and weave signals in response to detection of the reference perforation, the perforation detector being mounted relative to the scan line of the image frame located at the scan position;

(d) a sensor transport assembly mounted relative to the rotating film gate and moveable in a weave direction, and including means for mounting the image sensor for movement in the weave direction, wherein the image sensor mounting means includes a plurality of flexures; and (e) signal processing means responsive to the weave signal for causing the sensor transport assembly to move the linear image sensor in the weave direction to align the linear image sensor with the image frame associated with the reference perforation, and further including means responsive to the hop signal and the encoder signal for producing a start scan signal.

17. The film scanner according to claim 16 wherein the film defines interframe gaps between image frames and wherein the signal processing means causes the linear image sensor to be moved in the weave direction within an interframe gap.

18. The film scanner according to claim 16 wherein the signal processing means causes the linear image sensor to be moved gradually in the weave direction during the scanning of the image frame.

19. The film scanner according to claim 16 further including a source of radiation for illuminating scan lines of the image frame when the image frame is in the scan position.

20. The film scanner according to claim 19 wherein the source of radiation provides a line of illumination which extends across the film.

21. The film scanner according to claim 16 further including a source of radiation for illuminating the reference perforation, and means responsive to the radiation transmitted through the reference perforation to produce the hop and weave signals.

22. The film scanner according to claim 16 wherein the rotating film gate further includes two spaced-apart axially aligned rotatable wheels coupled to the rotatable encoder.

23. The film scanner according to claim 16 wherein there are two spaced-apart flexures which are parallel and of equal length.

24. A film scanner including a linear image sensor moveable to a scan position for scanning lines of image frames of an elongated film having a series of edge perforations including a reference perforation for each image frame, comprising:

(a) a rotating film gate for supporting the film in the scan position, the rotating film gate including a rotatable encoder for producing an encoder signal indicative of the position of the film as it passes through the rotating film gate;

(b) a film transport mechanism for advancing the film through the rotating gate;

(c) a perforation detector for producing hop and weave signals in response to detection of the reference perforation, the perforation detector being mounted relative to the scan line of the image frame located at the scan position;

(d) a sensor transport assembly mounted relative to the rotating film gate and moveable in a weave direction, and including means for mounting the image sensor for movement in the weave direction, wherein the image sensor mounting means includes a plurality of flexures;

(e) a film edge sensor mounted relative to the perforation detector for detecting displacement of the edge of the film in the weave direction, and for producing an offset signal in response to such displacement; and (f) signal processing means responsive to the weave signal and the offset signal for causing the sensor transport assembly to move the linear image sensor in the weave direction to align the linear image sensor with the image frame associated with the reference perforation, and further including means responsive to the hop signal and the encoder signal for producing a start scan signal.

25. The film scanner according to claim 24 wherein the film defines interframe gaps between image frames and wherein the signal processing means causes the linear image sensor to be moved in the weave direction within an interframe gap.

26. The film scanner according to claim 24 wherein the signal processing means causes the linear image sensor to be moved gradually in the weave direction during the scanning of the image frame.

27. The film scanner according to claim 24 further including a source of radiation for illuminating scan lines of the image frame when the image frame is in the scan position.

28. The film scanner according to claim 27 wherein the source of radiation provides a line of illumination which extends across the film.

29. The film scanner according to claim 24 wherein the rotating film gate further includes two spaced-apart axially aligned rotatable wheels coupled to the rotatable encoder.

30. The film scanner according to claim 24 wherein there are two spaced-apart flexures which are parallel and of equal length.

* * * * *